United States Patent [19]

Downs et al.

[11] 3,851,109

[45] Nov. 26, 1974

[54] TELEPHONE CONTROL SYSTEM

[76] Inventors: Robert F. Downs, 12049 Arroyo Dr., Santa Ana, Calif. 92705; Jerry J. Humphrey, 4961 Van Buren, Yorba Linda, Calif. 92686

[22] Filed: May 3, 1973

[21] Appl. No.: 356,814

[52] U.S. Cl. .......................... 179/18 DA, 179/90 B

[51] Int. Cl. ... H03k 21/22, H04m 1/66, H04m 3/38

[58] Field of Search ......... 179/18 DA, 27 CB, 90 B, 179/90 AN, 175.2 A, 2 A, 2 CA, 5.5, 7 R, 8 R, 18 BA, 18 EB; 235/92 FD, 92 EA, 92 TE

[56] References Cited

UNITED STATES PATENTS

| | | | |
|---|---|---|---|
| 3,452,160 | 6/1969 | McFarland | 179/90 B |
| 3,553,382 | 1/1971 | Knox et al. | 179/18 DA |
| 3,569,634 | 3/1971 | Amadasi et al. | 179/18 DA |
| 3,636,319 | 1/1972 | Nixon | 235/92 EA |

*Primary Examiner*—Thomas A. Robinson
*Attorney, Agent, or Firm*—Richard Morganstern

[57] ABSTRACT

A system for connection to telephone equipment for purposes of selectively allowing or disallowing outgoing calls is disclosed. During a dialing sequence the system interrogates dialed digits to determine if the dialed sequence is to be allowed or disallowed as a function of pre-programmed instructions. Two sequential operating modes are provided. The first causes call termination if a disallowed digit is dialed during a selected dial pull. The second acts after a predetermined number of dial pulls (if the first mode has not been activated) and causes the system to allow or disallow the outgoing call attempt based upon its prior analysis of the dialing sequence.

13 Claims, 2 Drawing Figures

TELEPHONE CONTROL SYSTEM

BACKGROUND OF THE INVENTION

1. Field of the Invention

The present invention relates to telephone systems and, more specifically, to means and apparatus adapted to selectively allow and disallow the completion of telephone calls from one or more telephones.

2. Description of the Prior Art

The increasing use of Direct Distance Dialing (DDD) has rendered the telephone subscriber increasingly susceptible to the placement of long distance calls by unauthorized personnel. Attempts at devising a practical system to solve the problem of unauthorized telephone calls while retaining a sufficient amount of flexibility and utility have faced a number of significant problems. These problems may be appreciated from the following brief description of some of the various dialing systems currently in general usage.

The first of these is the type found in many homes or businesses served by modern central offices. In this system local calls are accomplished by dialing seven digits referred to as ABC-DEFG. Long distance calls are accomplished through the addition of a prefix number and a three digit area code, for example:

$$1-X\binom{0}{1}X\text{-ABC-DEFG}$$

The first dialed digit is typically always a 1 while the second digit of the area code is always a 0 or 1.

In some areas long distance numbers with associated charges are present within the same area code. These numbers are generally accessed by dialing 1 -ABC-DEFG. In some areas a universal three digit emergency number of 911 has been instituted. Other important three digit numbers may also be available such as a telephone service number (611) and an information number (411).

Another important number sequence associated with long distance calls is the long distance information number of $$1-X\binom{0}{1}X\text{-555-1212}$$

The 1212 numbers are primarily dummy numbers used to satisfy the telephone systems' logic requirements. The A digit number of 0, of course, typically signifies the operator.

Variations of the preceding dialing systems are found in PBX systems. In such systems certain additional prefix numbers are utilized. Generally, a first dialed digit of 9 is used to transfer from the internal PBX system to the Central Office system. Generally, a 0 on the first dial pull is used to obtain the PBX operator. Internal PBX connected phones are generally accessed by one, two, three of four digit numbers. Usually, once an outside line has been obtained, as by dialing the 9 access number, the remainder of the dialing procedure is the same as previously indicated.

Another telephone system variation is found in areas such as the greater Los Angeles area (213 Area Code). This type of system does not require the 1 prefix number for DDD calls. Other dialing procedures within such systems are typically the same, including those for PBX systems.

There have been a number of attempts at solving the problem of unauthorized calls. One such attempt involves the use of inexpensive dial locks which, for all practical purposes, disable the telephone from any convenient use other than call reception. More sophisticated techniques include, at one end of the spectrum, elaborate and expensive electronic systems that use, inter alia, digital computers or their equivalent to monitor the complete dialing sequence and either allow or disallow attempted calls as a function of preprogrammed instructions.

Several less expensive devices have been developed that, through electromechanical or electronic means, count the number of dial pulls. If an excessive number of pulls are attempted, the call is disallowed. These devices, referred to as "pull counters," lack flexibility, are overly restrictive and greatly decrease the utility of the telephone to the subscriber since only local calls can normally be placed. Some of these systems also disable the telephone if a 0 (operator) is dialed on the first dial pull.

Other relatively inexpensive devices have been developed which attempt to diagnose the first two dialed digits and, if these digits are either a 0 or a 1, prevents call completion. Electromechanical versions of these devices are generally quite bulky and, along with the electronic devices, typically consume considerable power even when in a standby condition.

While both single and two digit analysis is acceptable in certain applications, it is often inadequate since for all practical purposes the telephone is limited to local calls. There are many situations where sufficient flexibility is desired to authorize calls, for example: (*a*) to geographically adjacent area codes, (*b*) to long distance areas within the same area code, (*c*) to certain specific area codes and (*d*) to special DDD numbers such as information.

A further disadvantage of many telephone restriction devices is that they are not simultaneously compatible both with standard telephone company coupling arrangements and with non-coupler hardwired arrangements. This can be a severe applications handicap. Another significant disadvantage with prior art dialing restriction devices is that many really do not completely perform their intended function and are capable of being defeated. This can best be understood by investigating the operation of a typical restriction system in conjunction with a typical telephone system.

Consider the situation that occurs when a caller places an authorized call as, for example, to a local number. Assume that when the call is completed the called party hangs up his instrument and the caller does not. To this point in time a situation termed "call party supervision" exists. This means that the caller is essentially controlling the telephone network. Typically, after 15 or 20 seconds the central office automatically takes control of the telephone line from the caller (control may now be termed "central office supervision") and the system reverts to dial tone. Normally, the caller's telephone restriction device requires the sensing of a hanging up condition to effect resetting. If the caller does not hang up the restrictor will not act on the next dialing sequence. If the caller wishes he can at this point in time signify any desired point within the telephone network. Thus it is possible to trick such telephone restriction devices thereby rendering them ineffective. A discussion of one aspect of this general problem can be found in U.S. Pat. No. 3,331,926 to Largey which seeks to overcome the above-described problem by detecting each seizure of the calling party's line by the central office equipment.

Additional examples of prior art telephone line restrictors are described in U.S. Pat. No. 3,553,382 to Knox and U.S. Pat. No. 3,569,634 to Amadasi. The Knox system may be arranged to disallow calls on a line by sorting dialed digits and, using a decision matrix, to produce a "not allowed" signal which functions to disconnect the calling party from the phone system. The Knox system requires a separate counter for each dialed digit. This type of system results in hardware complexity, increased cost and power consumption. The consumption of power in the "idle" condition is an important disadvantage of many prior art devices.

Amadasi describes a system which operates responsive to only the first dialed digit in order to prevent placement of all calls except local numbers. If either a 0, 1 or 9 is detected, a relay is activated which opens the telephone line thereby preventing call placement. Hanging up the instrument (placing it on hook) resets the system which readies it for reuse. The versatility of an Amadasi-type system is limited and results in restricting the use of a telephone to completion primarily of local calls. The Amadasi system also requires significant power during idle or standby.

A telephone line restrictor having the properties of flexibility, simplicity and moderate cost and exhibiting low power consumption requirements in the "on hook" condition would be highly desirable.

Such a system should be compatible with virtually all types of dialing systems and provide for interfacing, in a simple manner, to the telephone network. It should have sufficient flexibility such that associated telephone sets do not lose much of their usefulness. The system should be capable of allowing telephone calls to other than local areas in a manner as desired by the subscriber. It is also important that the telephone control system exhibit no false modes which might allow a user to complete unauthorized calls by defeating the system.

SUMMARY OF THE INVENTION

In accordance with the present invention a telephone line restricting system is provided which solves the above indicated problems.

The present invention provides means associated with a telephone set to monitor the on-hook/off-hook condition and the dialing information on the telephone line. The system requires significant power only in the off-hook condition to limit continuous power requirements. A system "reset" signal is provided when the telephone is initially taken off hook. Means are further provided to generate a conditioned pulse train corresponding to the dial pulses initiated by an associated telephone set.

In contrast with prior art approaches wherein separate counters are provided for each dialed digit to be detected, in the present invention multiple dialed digit analysis is effected by "counting" each dialed digit in a single register or counter. The register is reset after analysis of each digit so that it may be reused for the next dialed digit.

Means are further provided to detect each dial pull. An additional register is used to count the dial pulls. After each dial pull both the dial pull count and dialed digit information is made available to a programming array interconnecting means. The programming array allows selective connection of the dial pull and dial digit information to an array of logic code detector means and prefix detector means. The programming array interconnection forms the set of operating instructions for the system, directing which dialed numbers and number groups shall be allowed and which disallowed.

The programming array may typically consist of a set of easily changed interconnection points such that both the dialed digit and dial pull information can be directed, in a desired preselectable manner, to the code and prefix detector means. This allows for considerable system versatility.

During an initial preselected dial pull the prefix detector means functions to detect predetermined single dialed digits. Detection of these digits causes immediate call disallowment by activation of a latching means which opens the telephone line. If a selected prefix digit is not detected then, after a selected subsequent dial pull, the code detector means determines if a desired number group has been dialed. If so, a signal is provided to prevent the latching means from disallowing the call. If an allowed sequence is not dialed, then the latching function is initiated when the preselected number of dial pulls are attempted.

A timing function is included such that after a period of time subsequent to the first dial pull (even if an allowed number series has been dialed) it will not be possible to dial further without causing immediate system disallowment.

In the present invention both dialed digits and dial pulls are monitored according to a specific set of instructions provided by a programming array. By employing two distinct, sequential operating modes all types of unauthorized calls may be protected against while leaving the phone with wide versatility.

Other novel aspects, features and attendant advantages of the invention will become apparent to those skilled in the pertinent art from a reading of the following description of preferred embodiments constructed in accordance therewith taken together with the accompanying drawings wherein:

DESCRIPTION OF THE PREFERRED EMBODIMENTS

Figure 1:
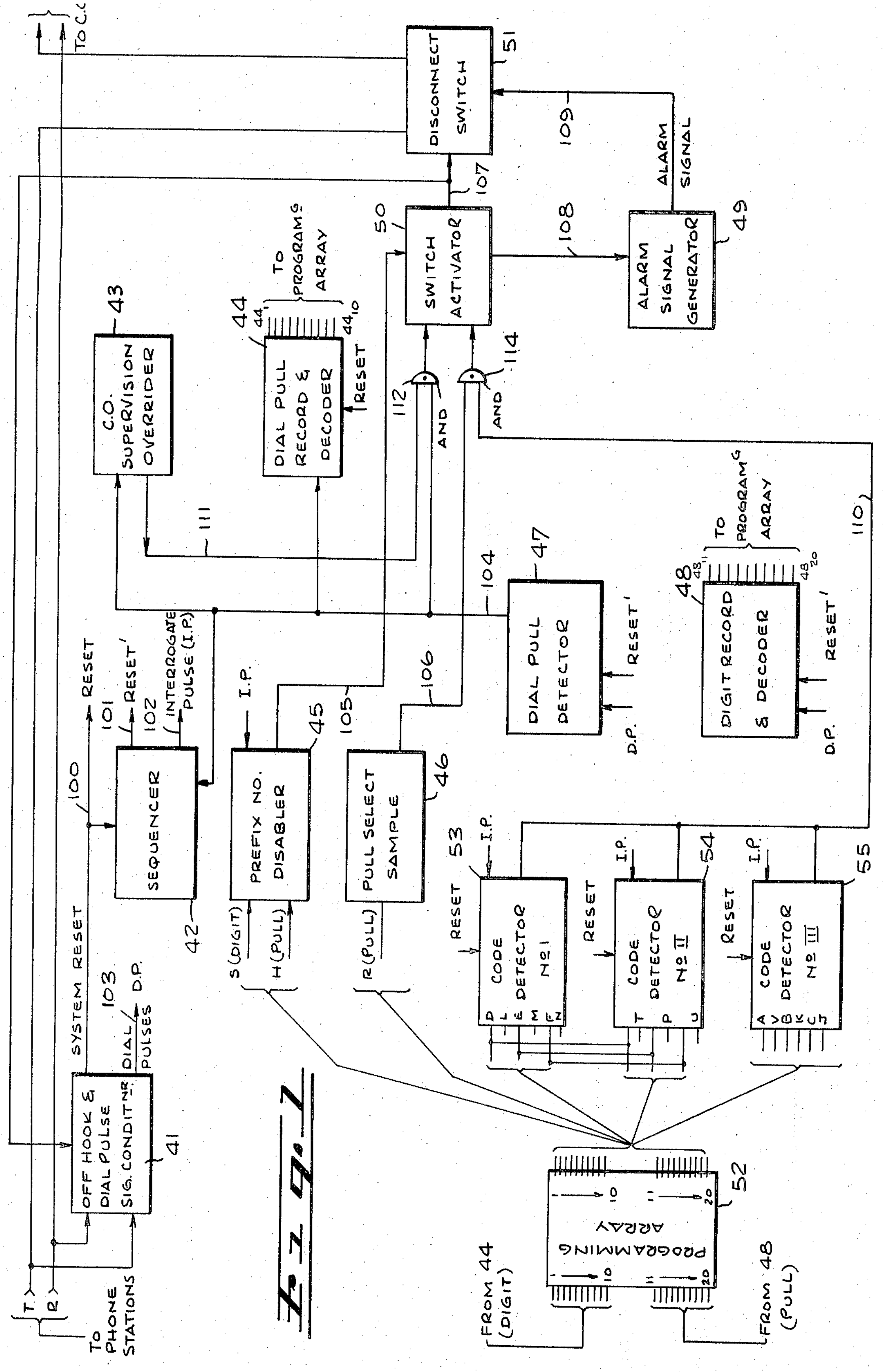
FIG. 1 is a block diagram of an exemplary telephone control system constructed in accordance with the principles of the present invention.

In FIG. 1 there is shown, in block diagram form, an exemplary system constructed in accordance with the principles of the present invention adapted for connection to a telephone instrument for purposes of selectively allowing or disallowing outgoing calls. An exemplary telephone line comprising standard T-R leads operatively connected both to an exemplary phone station (not shown) and to standard central office switching equipment (not shown) is illustrated. One of the T-R leads is connected through a disconnect switch 51 which is adapted, upon activation by a switch activator 50, to open the telephone line to prevent completion of an unauthorized call.

The system includes an off-hook and dial pulse signal conditioner 41 which is connected, as shown, across the T-R leads. Signal conditioner 41 senses an initial "off-hook" condition and the subsequent dialing pulse information. As is known, when a telephone is initially taken off hook, the voltage across the T-R leads drops from a nominal value of approximately 48 volts to approximately 6 volts, the voltage drop resulting from connection of the T-R leads at the phone station.

Dialing information is typically conveyed to the central office equipment by providing a series of dialing pulses effected by connecting and disconnecting the T-R leads in accordance with a pulse sequence controlled by each phone instrument. In operation, manipulation of the phone set dial generates a series of interrupted signals. These signals are detected by signal conditioner 41 which generates conditioned dial pulses (D.P.) of predetermined polarity, amplitude and duration to the remaining circuits of the system. Signal conditioner 41 also, as above described, provides to the system a system reset signal (reset) responsive to sensing the initial off-hook condition.

The conditioned dial pulses are provided to a dial pull detector 47 and a digit record and decoder 48. Dial pull detector 47 responds to the series of dial pulses associated with each dial pull to provide an output pulse on line 104 at the end of each series of dial pulses. Detector 47 may comprise, for example, a simple timing circuit having a time delay which is reset by each dial pulse. The delay interval is selected to be greater than that normally experienced between consecutive dial pulses. After the last dial pulse in each dial pull, the timing circuit is not reset and the detector 47 provides an output pulse on line 104 after the selected delay interval.

The dial pull detector pulse is provided to a dial pull record and decoder element 44. Element 44 preferably comprises a binary counter and binary to decimal converter of the type having a plurality of "decimal" output lines $44_1 - 44_{10}$ having a signal state corresponding to the binary counter value. Thus, of the output lines $44_1 - 44_{10}$ of element 44 only the line corresponding to the decoded dial pull number will have a "high" output state. Element 44 also receives the system reset pulse which functions to reset the counter to a "zero" condition after each initial "off-hook" condition is detected.

The conditioned dial pull pulse on line 104 is also applied to a system sequencer 42. Sequencer 42 responds to the applied dial pull pulse to provide a system interrogate pulse (IP) on line 102 and a system reset' pulse (reset') on line 101. The IP and reset' pulses are utilized by the system in a manner to be hereinafter described. The IP pulse is provided a preselected interval before the reset' pulse.

The dial pulse information is also applied, as above described, to a digit record and decoder element 48. Element 48 preferably comprises a binary counter and binary to decimal converter of the same type described in connection with dial pull record and decoder element 44. The dial pulses sequence the binary counter. Thus, for each dial pull the output on lines $48_{11} - 48_{20}$ will be a function of the number of pulses detected by element 48. As an important feature of the present invention only a single record and decode element is required to count dial pulses for all dial pulls. This simplicity is achieved by resetting the digit record and decoder element 48 after each dial pull with the reset' signal. Decoder 48 is then available to count the dial pulses associated with the next dial pull.

The output from dial pull record and decoder element 44 and the digit record and decoder element 48 are applied, via a programming array 52, to a prefix number disabler 45, a pull select sampler 46, and three area code detectors 53, 54, and 55. The programming array 52 may be a simple terminal interconnection device which accepts the dial pull information from dial pull record and decoder element 44 and the dial information from digit record and decoder element 48 and selectively interconnects the output terminals from these components to the input terminals of components 45, 46, 53, 54, and 55.

It will be appreciated that for each dial pull, the output of dial pull record and decoder component 44 (present on output line $44_1 - 44_{10}$) will represent the number of the dial pulls from the initial "off-hook" condition. The output of digit record and decoder element 48 (present on lines $48_{11} - 48_{20}$) will represent the digit (i.e., the number of pulses actually dialed at the phone station) dialed by the given dial pull. This information is applied via a preselected wiring arrangement determined by programming array 52 to components 45, 46, 53, 54 and 55.

Prefix number disabler 45 functions to detect the presence of a preselected dial digit occurring on a preselected dial pull. To perform this function disabler 45 is connected, via programming array 52, both to the selected digit (on input line S) and to (on input line H) the selected dial pull during which the digit is to be detected. Prefix number disabler 45 also receives the system interrogate pulse which causes disabler 45 to provide an output pulse on line 105 if the programmed conditions (i.e., the occurrence of the selected digit on the selected dial pull) are met.

The output pulse from disabler 45 is applied to switch activator 50. Switch activator 50 accepts a number of input signals including the above-mentioned pulse on line 105. Upon receipt of an appropriate input signal, activator 50 initiates disconnect switch 51 and alarm signal generator 49. Disconnect switch 51 functions to accomplish call termination. As shown, one side of the telephone line (the T lead in this case) is wired through disconnect switch 51. When activated, switch 51 opens the T lead to prevent call completion. Alarm signal generator 49 provides an audible alarm signal to the caller when the system enters its disallowment mode. It is to be noted that although disabler 45 is interrogated by the I.P. pulse from line 102 after each dial pull, it will not initiate switch activator 50 unless the disabler detects a preselected digit on a preselected dial pull. The pull and digit requirements depend upon the particular interconnection of input lines S and H with programming array 52.

Code detectors 53, 54 and 55 comprise various logic and counting elements to be described in greater detail hereinafter. The detectors function to determine whether allowed number sequences have been dialed. The number sequences to be allowed are also programmed by the manner in which the detector input lines D, L, T, P, A, V, etc. are connected with programming array 52. At the conclusion of each dial pull each detector receives the system interrogate pulse to initiate analysis of the dial pull and dialed digit information.

Once a programmed number sequence is dialed one of the detectors provides an output signal via the area code decision line 110 indicative of the detection of an allowed sequence. This signal is applied to and AND gate 114. The other input to AND gate 114 is derived from a pull select sampler 46. Pull select sampler 46 is connected to one of the outputs of dial pull record and decoder element 44 via programming array. The dial pull selected depends upon the number of dial pulls to be allowed prior to determining whether an allowed numbering sequence has been dialed.

The output of pull select sampler 46 on line 106 changes state when the selected dial pull is detected. Unless a predetermined number sequence has been detected by detectors 53 – 55 (signified by a signal state change on line 110) AND gate 114 will provide an initiate signal to switch activator 50. This results in call termination in the manner previously described with respect to the operation of prefix number disabler 45. If a preselected number sequence is detected, however, the logic signal level on line 110 does ot satisfy the requirements of AND gate 114 and an initiate signal is withheld from switch activator 50.

As a further important feature of the present invention, a central office supervision overrider 43 is provided. Overrider 43 receives the output pulses from dial pull detector 47. Upon receipt of preferably the first dial pull pulse, overrider 43 initiates a timing function. During a preselected time interval, as measured from the detection of the first dial pull pulse, the output of line 111 from overrider 43 is in a first logic state. After the preselected time interval the output on line 111 changes logic state.

As shown, the output of overrider element 43 is provided to an AND gate 112. The other input to AND gate 112 is derived from the output of dial pull detector 47. If an additional dial pull is attempted after the preselected time interval has expired (corresponding to a point in time when line 111 has a signal corresponding to the changed logic state) the dial pull pulse from dial pull detector 47 will satisfy the conditions of AND gate 112 to provide an initiate signal to switch activator 50. This results in immediate call termination in the manner previously described. The overrider timing function prevents the system from being defeated by a caller first dialing an allowed number sequence and then attempting to dial an unauthorized number when the caller retains control over his lines. A delay interval of twenty seconds has been found acceptable to prevent the system from being defeated by the above-described procedure.

Figures 2, 3:
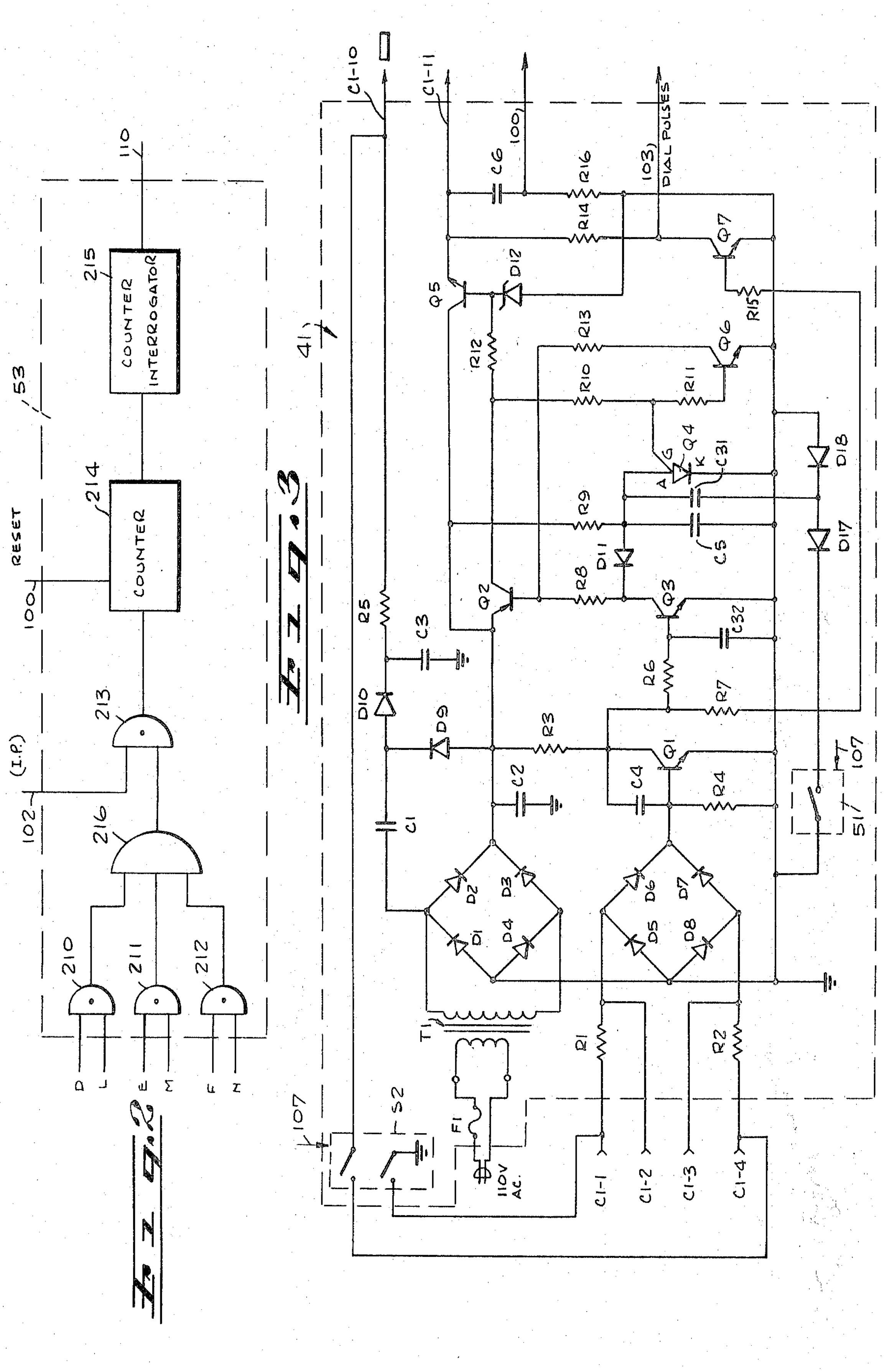
FIG. 2 is a block diagram of an exemplary code detector of FIG. 1.
FIG. 3 is a circuit schematic of an exemplary power supply and off hook and dial pulse signal conditioner constructed in accordance with the principles of the present invention.

Turning briefly to FIG. 2, an exemplary code detector 53 is illustrated. As above described, code detector 53 functions to detect the presence of a desired dialing sequence to prevent the actuation of switch actuator 50. The exemplary code detector circuit shown in FIG. 2 is adapted to interrogate three selected dial pulls to determine if a desired number has been dialed on each of the selected pulls. The dial pulls may be selected to be three consecutive pulls allowing detection, for example, of an area code sequence. As will be apparent this is not a requirement however. To understand the operation of code detector 53 assume that it is desired to allow call completion to Area Code 213. An area code is normally dialed on the second, third and fourth dial pulls. For this purpose the input terminals of code detector 53 are connected to programming array 52 as follows:

TABLE I

| | |
|---|---|
| D to | 2 |
| L to | 12 |
| E to | 3 |
| M to | 11 |
| F to | 4 |
| N to | 13 |

If a 2 is in fact dialed on the second dial pull then both lines D and L will be high. Lines D and L are the inputs to an AND gate 210. The output 210 will therefore be high providing one high input to an AND gate 213 via an OR gate 216. The other input to AND gate 213 is the system interrogation pulse on line 102. The occurrence of the interrogation pulse will cause AND gate 213 to apply a pulse to counter 214. Counter 214 is initially set to zero by the system reset signal on line 100 after each "off-hook" condition is detected.

Dialing a digit 2 on the second dial pull therefore causes counter 214 to record a 1 count. The counter output is applied to a count interrogator 215. Count interrogator 215 has as an output one of two signals depending upon whether counter 214 reaches a preselected count value. Thus, in the example discussed, counter interrogator 215 would be set to seek a 3 count in counter 214.

In view of the described programming arrangement of the inputs to code detector 53, counter 214 will reach a 3 count only if a 1 and a 3 are dialed on the third and fourth dial pulls after a 2 has been dialed on the second dial pull. If such a dialing sequence is experienced counter interrogator 215 detects a 3 count in counter 214 and provide an output signal on line 110 to prevent the application of the initiation signal to switch activator 50 (FIG. 1). Although in the described example detector 53 is wired to respond to three consecutive dial pulls such is obviously not a requirement.

Code detector 54 and code detector 55 may preferably be identical to the code detector 53 as described in FIG. 2. This, however, is not a requirement. Various other detection circuits capable of detecting any desired number sequences may be readily designed in accordance with the teachings of the present invention.

Operation of the system of FIG. 1 may better be understood having regard to an exemplary programming array wiring arrangement and dialing sequence. Assume, therefore, that programming array 52 is wired as follows:

TABLE II

| | |
|---|---|
| S to | 20 |
| H to | 1 |
| R to | 8 |
| D to | 2 |
| E to | 3 |
| F to | 4 |
| L to | 12 |
| M to | 11 |
| N to | 13 |
| T to | 14 |
| P to | 20 |
| U to | 15 |

TABLE II-Continued

| | |
|---|---|
| A to | 5 |
| B to | 6 |
| C to | 7 |
| V to | 15 |
| K to | 15 |
| J to | 15 |

This connection arrangement will program the system to allow completion of area code calls to Area Codes 213 and 405. Calls to the long distance information operator (i.e., 1-XXX-555-1212) are also allowed. All other long distance calls as well as operator access calls (i.e., where a 0 is dialed on the first pull) are disallowed. When a telephone instrument to phone line T-R is taken off-hook, a reset pulse is provided by off-hook and dial pulse signal conditioner 41 to reset the counters in dial pull record and decoder 44 and the code detectors 53 – 55. When the first digit is dialed, the conditioned dial pulses are applied by signal conditioner 41 to dial pull detector 47 and digit record and decoder 48. The number of dial pulses are recorded by digit record and decoder 48. At the conclusion of the first train of dial pulses, dial pull detector 47 produces a dial pull signal which is applied to dial pull record and decoder 44. The decimal value of the dialed digit and the decimal dial pull number is now available on output lines $48_{11}$ – $48_{20}$ and $44_1$ – $44_{10}$, respectively.

This information is made available to prefix number disabler 45 via programming array 52. A preselected time delay after the dial pull detector pulse the system interrogate pulse (IP) is provided by sequencer 42 and is used to interrogate prefix number disabler 45. If input lines S and H indicate that a "zero" digit has been dialed on the first dial pull, then disabler 45 produces an output which will cause switch activator 50 to initiate disconnect switch 51. Activation of disconnect switch 51 opens the telephone line T lead to prevent call completion. If a "zero" is not dialed on the first dial pull, then prefix number disabler 45 will not so respond and the dialing sequence may continue.

As soon as the first dial pull has been completed the dial pull pulse on line 104 also serves to initiate a time delay element in central office supervision overrider 43. At the conclusion of the time delay, typically twenty seconds, the output of overrider 43 changes logic states such that a subsequently detected dial pull satisfies the conditions of AND gate 112 to cause initiation of switch activator 50 and resultant call termination.

Immediately after sequencer 42 produces its interrogation pulse a system reset' pulse is provided by sequencer 42. The reset' pulse resets the counter in digit record and decoder 48 to enable it to be used for the next dial pull and also resets the timing circuitry in dial pull detector 47. The next dial pull also produces a train of conditioned dial pulses which are counted by digit record and decoder 48, the number of dial pulls being recorded by dial pull record and decoder 44 as previously described.

If the second dialed digit is a 2, then detector 53 will record this agreement by recording a count in its associated counter. If the dialed digit is a 4, then detector 54 will instead record the agreement by recording a count in its associated counter. As indicated in FIG. 1, detectors 53 and 54 may be interconnected at their inputs to respond to the same dial pulls, thus providing a multiple code detection capability.

During the third dial pull if a 1 digit is dialed, detector 53 will record the agreement. If a 0 digit is dialed, detector 54 will record the agreement.

During the fourth dial pull if a 3 digit is dialed, detector 53 records the agreement. If the dialed digit is a 5, detector 54 will record the agreement.

If either detector 53 or 54 have experienced three agreements, then the counter associated with the specified detector will have reached a 3 count value. This causes the area code decision line 110 to change logic state signifying that the call attempted should be allowed as above described. If three agreements have not been recorded, then the question of call allowment is directed to code detector 55.

If a 5 is dialed during the fifth dial pull, detector 55 will record this agreement. This same proceeding will occur during the sixth and seventh dial pull if the digit 5 is dialed. At this time if three agreements have been recorded by detector 55 a state change will result in the area code decision line 110 in the manner as described above.

As soon as the eighth dial pull has occurred, a state change occurs on line R (the input line to pull select sampler 46). The output from pull select sampler 46 and the code decision line 110 are applied as inputs to AND gate 114. If a state change has occurred on the area code decision line 110 then the AND gate conditions are not satisfied and an activation signal is not provided to switch activator 50.

In case of local calls which typically require only seven dial pulls it is apparent that call termination will not occur (except for a zero dialed on the first digit) since the call termination decision does not take place until the eighth dial pull. Therefore, the system wired in the configuration described prohibits calls to the operator, allows local calls, allows calls to the two chosen area codes and additionally permits access to the long distance information operator.

As soon as call termination occurs, an oscillator in alarm signal generator 49 is activated to notify the caller that the call did not go through. If the call attempt is disallowed, then, after the caller hangs up, the system will remain in its disallowed mode for a preselected period of time as determined by a time delay function in off-hook and dial pulse signal conditioner 41. This time delay will typically be on the order of two seconds. If the call attempt did not result in disallowment, the time delay may preferably be much shorter, on the order of 100 milliseconds of less.

Referring now to FIG. 3, there is shown a circuit schematic of an exemplary off-hook and dial pulse signal conditioner 41 of FIG. 1. Signal conditioner 41 as shown also provides power to the system components. System power may be derived, for example, from a standard 110 volt AC 60 cycle line via a transformer T1. The AC power is rectified by a diode bridge D1 – D4 and filtered by a capacitor C2. A conventional voltage doubler comprising capacitor C1, diodes D9 and D10 and capacitor C3 is provided. The stepped-up rectified voltage is available via a resistor R5 at high voltage bias terminal C1 - 10.

Terminals C1-1 to C1-4 comprise the input interface terminals to the telephone system and are adapted to be connected to the T and R leads of the phone line. Terminals C1-1 and C1-4 contain isolation resistors R1 and R2, respectively, and are used in the absence of an auxiliary coupling arrangement. Terminals C1-2 and C1-3 are for use with a suitable auxiliary coupling arrangement (not shown).

When the phone station is "on-hook" the voltage across the T and R leads at the subscriber's station is typically on the order of 48 volts DC. This voltage is rectified by diode bridge comprising diodes D5 – D8. Bridge D5 – D8 renders the system independent of voltage polarity on the T and R leads. The rectified voltage maintains a transistor Q1 in a conducting mode. The voltage at the collector of Q1 is thus maintained at approximately a zero voltage level in the "on-hook" condition.

Except for transistor Q1 and gate controlled switch Q4 all other active system elements are maintained in an "off" condition when the phone station is "on-hook." The power required in the "on-hook" condition is therefore primarily determined by the emitter voltage of transistor Q2 and the value of resistor R3 and R9. A typical power requirement of only 10 milliwatts or less may be achieved and this constitutes the total "on-hook" power requirements of the system of the present invention.

When the telephone station goes "off-hook" corresponding to a phone station seizing the T-R line, the telephone line voltage typically goes from its "on-hook" value of 48 volts to its "off-hook" value of 6 volts. Dialing information is conveyed by "pulsing" the line between its "off-hook" and "on-hook" values. Each pulse corresponds to one digit. For example, five pulses would correspond to the digit 5. The dial pulses are reconstituted by transistors Q1 and Q7. A delay circuit including gate control switch Q4 and associated components prevents the dial pulses (normally occurring at a 10 pulse per second rate) from affecting the power supply circuitry.

When the station is first taken "off-hook" the rapid turn-on of a transistor Q5 is coupled through capacitor C6 causing a positive going pulse at terminal 100. This is the system "reset" signal. After capacitor C6 is charged terminal C1 - 11 provides a low voltage system bias signal. Dialing pulses are conditioned, as above described, by turning on and off transistor Q7 at the selected pulse rate to provide reconditioned dialing pulses at terminal 103.

When the handset is placed "on-hook," the telephone control system above described will rapidly return to its "on-hook" condition assuming that the disconnect feature has not been activated. The time required for returning to the "on-hook" condition is determined by the discharge time of capacitor C5 in FIG. 3. Where auxiliary coupling arrangements are utilized, however, telephone requirements normally specify a dwell period in the disconnect mode (prior to returning to the "on-hook" condition). The increased dwell time is achieved in the illustrated embodiment by switching an additional capacitor C31 in parallel with capacitor C5 when the disconnect mode is entered. The switching function is achieved by switch S1, FIG. 3, which is activated by the disconnect switch actuator signal from line 107 (FIG. 1), of course, if auxiliary coupling equipment is not utilized, the additional capacitor is not required.

In the case where an auxiliary coupling arrangement is not used, it is also necessary, when the system enters its disconnect mode, to continue to provide power to the station side of the equipment so that the system may sense a subsequent "on-hook" condition. This is achieved in the illustrated embodiment by connecting the high voltage bias available at terminal C1 - 10 to the station tip lead (terminal C1 - 4) when the system enters the disconnect mode. At the same time the ring lead (terminal C1 - 1) is connected to ground. The switching function is achieved by a switch S2 which is under the control of the disconnect switch actuator signal from line 107 (FIG. 1).

It will be understood that although a preferred embodiment of apparatus constructed in accordance with the principles of the present invention has been described other embodiments and modifications within the scope of the teaching will become apparent to those knowledgeable in the art. For example, while specific code detectors have been described having the capability of detecting two distinct area codes and the long distance information code, other embodiments either more or less restrictive may be provided by simple modification of the code detection logic. Further, the apparatus is capable of operation with telephone instrument dialing arrangements other than that described. As an example, where dialing is effected by transmitting a sequence of tones, the apparatus would be readily modified to include tone decoding components to provide the dial pulse information. Accordingly, it is to be understood that the scope of the invention is not to be limited by the detailed description but only by the appended claims.

We claim:

1. Apparatus associated with a telephone line for prohibiting unauthorized calls from being completed by a telephone connected to the line, said apparatus comprising:

first signal generating means responsive to dialing signals on the line for providing a first sequential plurality of output signals on a first plurality of output lines, each of said first output signals being functionally related to the digit dialed on each dial pull;

second signal generating means responsive to dialing signals on the line for providing a second sequential plurality of output signals on a second plurality of output lines, each of said second output signals being functionally related to the number of digits dialed;

code detection means responsive to said first and said second plurality of output signals for generating an initiation signal responsive to the detection of the absence of selected dialed digit sequences, the sequences being selectable as a function of the manner of interconnection of said first and second plurality of output lines with said code detection means;

means associated with the line and responsive to said initiation signal for blocking call completion.

2. The apparatus of claim 1 further comprising:

means for selectively connecting said first and said second plurality of output lines to said code detection means.

3. The apparatus of claim 2 wherein said last named means comprises:

a first plurality of input terminals adapted to be connected with said first and second plurality of output lines; and a plurality of output terminals connected one each to said plurality of input terminals, said plurality of output terminals adapted to be selectively connectable to a second plurality of input terminals on said code detection means.

4. The apparatus of claim 1 further comprising:

means for generating a dial pull signal upon the occurrence of each dialed digit;

timing means for generating an override signal a preselected time interval after the occurrence of the first dialed digit; and means responsive to the occurrence of a dial pull signal subsequent to the initiation of said override signal for generating said initiation signal, whereby call completion will be prevented should dialing be attempted after said preselected time interval.

5. The apparatus of claim 1 further comprising:

further code detection means responsive to a selected one of said first plurality of output lines and a selected one of said second plurality of output lines for generating said initiation signal responsive to the occurrence of the selected dialed digit on the selected dial pull, whereby call completion will be prevented.

6. In a telephone line restriction apparatus for selectively terminating attempted calls as a function of the digit dialing signals on the line, the improvement comprising:

first counter means responsive to the digit dialing signals on the line for counting each dialed digit and providing an output digit count signal;

means for resetting said first counter means subsequent to each series of dialing signals corresponding to a single dialed digit, whereby said first counter means may be used to count each dialed digit without regard to the number of digits dialed.

7. The apparatus of claim 6 further comprising:

second counter means responsive to the digit dialing signals on the line for counting the number of digits dialed and providing an output dial pull count signal corresponding to the number of digits dialed in each dialing sequence.

8. The apparatus of claim 7 further comprising:

means for comparing each digit count signal and each dial pull count signal with preselected digit count signal and dial pull count signal values and providing a concurrence signal when said digit and count signals match one of said preselected signal values.

9. The apparatus of claim 8 further comprising:

third counter means for counting the number of generated concurrence signals and providing an output total concurrence signal.

10. The apparatus of claim 9 further comprising:

means responsive to a preselected dial pull count signal value for interrogating the output of said third counter means.

11. The apparatus of claim 10 further comprising:

initiation signal generating means responsive to the interrogated total concurrence signal for generating an initiation signal responsive to the total concurrence signal value being below a preselected value.

12. The apparatus of claim 11 further comprising:

means associated with the telephone line and responsive to said initiation signal for blocking call completion.

13. The apparatus of claim 12 wherein said last named means comprises:

a normally closed switch in series electrical connection with one side of said telephone line; and means responsive to said initiation signal for opening said switch, whereby said telephone line will be opened to block call completion.

* * * * *

UNITED STATES PATENT OFFICE

CERTIFICATE OF CORRECTION

Patent No. 3,851,109 Dated November 26, 1974

Inventor(s) Robert F. Downs and Jerry J. Humphrey

It is certified that error appears in the above-identified patent and that said Letters Patent are hereby corrected as shown below:

Column 7, Line 8, "and" should be --an--;

Column 11, Line 62, "," should be --.--;

Column 11, Line 62, "o" of "of" should be capitalized.

Signed and sealed this 4th day of February 1975.

(SEAL)
Attest:

McCOY M. GIBSON JR.
Attesting Officer

C. MARSHALL DANN
Commissioner of Patents